US010035200B2

(12) United States Patent
Stadtfeld et al.

(10) Patent No.: US 10,035,200 B2
(45) Date of Patent: Jul. 31, 2018

(54) GEAR CUTTER WITH RADIAL ADJUSTABILITY OF STICK BLADES

(71) Applicant: THE GLEASON WORKS, Rochester, NY (US)

(72) Inventors: Hermann J. Stadtfeld, Webster, NY (US); Anthony J. Norselli, Hilton, NY (US)

(73) Assignee: THE GLEASON WORKS, Rochester, NY (US)

( * ) Notice: Subject to any disclaimer, the term of this patent is extended or adjusted under 35 U.S.C. 154(b) by 447 days.

(21) Appl. No.: 14/439,789

(22) PCT Filed: Nov. 5, 2013

(86) PCT No.: PCT/US2013/068442
§ 371 (c)(1),
(2) Date: Apr. 30, 2015

(87) PCT Pub. No.: WO2014/074495
PCT Pub. Date: May 15, 2014

(65) Prior Publication Data
US 2015/0290725 A1 Oct. 15, 2015

Related U.S. Application Data

(60) Provisional application No. 61/724,531, filed on Nov. 9, 2012.

(51) Int. Cl.
B23C 5/24 (2006.01)
B23F 21/16 (2006.01)
(Continued)

(52) U.S. Cl.
CPC .......... *B23C 5/2489* (2013.01); *B23C 5/2472* (2013.01); *B23C 5/2493* (2013.01);
(Continued)

(58) Field of Classification Search
CPC ..... B23C 5/2472; B23C 5/109; B23C 5/2247; B23C 2210/168; B23C 5/2226;
(Continued)

(56) References Cited

U.S. PATENT DOCUMENTS 845,489 A * 2/1907 Thomas ................. B23B 27/08
407/117
1,836,472 A 12/1931 Jacobs
(Continued)

FOREIGN PATENT DOCUMENTS

AT 006939 U1 6/2004
GB 2483694 A 3/2012

OTHER PUBLICATIONS

International Search Report and Written Opinion for PCT/US2013/068442, ISA/EPO, dated Mar. 27, 2014, pp. 12.

*Primary Examiner* — Sara Addisu
(74) *Attorney, Agent, or Firm* — Robert L. McDowell

(57) ABSTRACT

A bevel gear manufacturing face cutter head (2) for face hobbing and face milling wherein the cutter head includes positive blade seating surfaces (16, 18) and the capability to clamp the blades (8) tight to the positive seating surfaces and to adjust the cutting blades radially after they are pre-clamped and axially located.

12 Claims, 11 Drawing Sheets

(51) Int. Cl.
 *B23F 21/12* (2006.01)
 *B23F 21/22* (2006.01)
(52) U.S. Cl.
 CPC .......... *B23F 21/126* (2013.01); *B23F 21/128* (2013.01); *B23F 21/226* (2013.01); *B23C 2210/165* (2013.01)
(58) Field of Classification Search
 CPC ........... B23C 5/2234; B23C 5/08; B23C 5/06; B23C 5/20; B23C 5/165; B23C 5/2204; B23F 21/126; B23F 21/223; B23F 21/226; B23F 21/128; B23F 21/22
 See application file for complete search history.

(56) References Cited

U.S. PATENT DOCUMENTS

| | | | | |
|---|---|---|---|---|
| 1,836,737 | A * | 12/1931 | Walker | B23C 5/2437 407/37 |
| 3,571,876 | A * | 3/1971 | Blakesley | B23F 21/226 407/22 |
| 4,078,868 | A * | 3/1978 | Erkfritz | B23C 5/2208 407/104 |
| 4,268,194 | A * | 5/1981 | Bloink | B23F 21/226 407/22 |
| 4,329,091 | A * | 5/1982 | Erkfritz | B23C 5/2441 407/108 |
| 4,530,623 | A * | 7/1985 | Kotthaus | B23F 21/226 407/22 |
| 5,890,846 | A | 4/1999 | Clark et al. | |
| 5,896,902 | A * | 4/1999 | Maybon | B23B 27/145 144/208.1 |
| 6,299,389 | B1 * | 10/2001 | Barazani | B23B 27/04 144/173 |
| 6,334,740 | B1 * | 1/2002 | Qvarth | B23C 5/207 407/36 |
| 6,571,451 | B2 * | 6/2003 | Satran | B23C 5/006 29/447 |
| 9,137,954 | B2 * | 9/2015 | Leonardi | A01G 23/067 |
| 9,216,458 | B2 * | 12/2015 | Sashin | B23B 27/1696 |
| 9,272,343 | B2 * | 3/2016 | Voege | B23C 5/1045 |
| 2002/0053266 | A1 * | 5/2002 | Enquist | B23B 27/1655 82/1.11 |
| 2003/0103818 | A1 * | 6/2003 | Astrom | B23C 5/08 407/41 |
| 2004/0025969 | A1 * | 2/2004 | Lindsay | B23C 5/207 144/241 |
| 2004/0131432 | A1 * | 7/2004 | Riviere | B23C 5/08 407/40 |
| 2004/0161311 | A1 * | 8/2004 | Satran | B23C 5/08 407/46 |
| 2004/0191008 | A1 * | 9/2004 | Noggle | B23C 5/06 407/46 |
| 2004/0191009 | A1 * | 9/2004 | Toyose | B23C 5/00 407/46 |
| 2005/0117981 | A1 * | 6/2005 | Satran | B23C 5/08 407/117 |
| 2006/0120812 | A1 | 6/2006 | Hecht et al. | |
| 2007/0183857 | A1 * | 8/2007 | Wihlborg | B23C 5/06 407/67 |
| 2008/0170915 | A1 * | 7/2008 | Muhlfriedel | B23F 21/226 407/27 |
| 2009/0196701 | A1 * | 8/2009 | Wihlborg | B23C 5/08 408/230 |
| 2010/0254774 | A1 * | 10/2010 | Hecht | B23B 27/007 407/101 |
| 2011/0150584 | A1 * | 6/2011 | Hakamada | B23C 5/08 407/46 |
| 2011/0150585 | A1 * | 6/2011 | Hakamada | B23C 5/08 407/47 |
| 2011/0305533 | A1 * | 12/2011 | Kisselbach | B23C 5/04 407/48 |
| 2013/0129435 | A1 * | 5/2013 | Ortlund | B23B 27/16 407/70 |
| 2014/0363243 | A1 * | 12/2014 | Koik | B23C 5/165 407/100 |
| 2015/0030397 | A1 * | 1/2015 | Heinloth | B23C 5/08 407/12 |
| 2015/0056026 | A1 * | 2/2015 | Hecht | B23C 5/22 407/47 |
| 2015/0125223 | A1 * | 5/2015 | Morrison | B23B 27/16 407/5 |
| 2015/0165527 | A1 * | 6/2015 | Roman | B23C 5/2213 407/103 |
| 2015/0196959 | A1 * | 7/2015 | Morrison | B23C 5/2273 407/108 |
| 2015/0328697 | A1 * | 11/2015 | Jiang | B23C 5/2226 407/46 |
| 2016/0288221 | A1 * | 10/2016 | Westfal | B23C 5/2221 |

\* cited by examiner

GEAR CUTTER WITH RADIAL ADJUSTABILITY OF STICK BLADES

This application claims the benefit of U.S. Provisional Patent Application No. 61/724,531 filed Nov. 9, 2012, the entire disclosure of which is hereby incorporated by reference.

FIELD OF THE INVENTION

The present invention is directed gear manufacture and in particular to a bevel gear face cutter head for face hobbing and face milling

BACKGROUND OF THE INVENTION

Bevel and hypoid gears can be cut in a single or intermittent indexing process (face milling) or in a continuous indexing process (face hobbing). A basic cutting setup in the generating or cradle plane will put the center of the cutter head in a position which is away from the generating gear center (cradle axis) by the amount of the so called radial distance. The silhouette of the cutter blades represents one tooth of the generating gear while the cutter rotates. Common face cutters for bevel gear cutting have several blade groups with each group having between one and four blades. The most common cutters are alternating (completing) cutters with one outside and one inside blade per blade group. In order to achieve an equal chip load of all inside blades and all outside blades during the cutting process, the cutting edges of all outside blades preferably follow each other at the same radial position. Also all inside blades should follow each other at the same radial position. In other words, all cutting edges of one kind (inside or outside) should generate the same cone surface while the cutter is rotating.

Manufacturing tolerances of the cutter head body, the blade blanks and deviations in blade profile grinding will introduce different cutting edge locations for the different blades in one cutter head.

While older face cutter systems allowed an adjustment of the radial blade position, today's stick blade systems have no provisions in order to accomplish a direct radial adjustment. However, known techniques which achieve a radial change of the cutting edge location include:

1. If a stick blade is moved in an axial position which is different from the nominal position, then the radius in the cutter reference plane increases or reduces by approximately $\Delta R = \Delta s \cdot \tan \alpha$, where $\Delta s$ is a positive or negative axial movement of the stick blade and $\alpha$ is the blade pressure angle (for example, see U.S. Pat. No. 5,839,943).
2. If a stick blade is clamped with two clamp screws (upper and lower), then the increase of the torque of the upper or lower screw can move the blade tip slightly radially, if the stick blade is not exactly straight or if the normal slot wall is not exactly plane.

The disadvantage of the above Method 1 is that the blade tips of all axially shifted blades will be moved out of their common tip plane. While the blade adjustment improves the radial cutting edge location, it causes a runout of the blade tips. The blade tip runout will contribute to premature tip wear of the blades.

The disadvantage of the above Method 2 is that the cutter requires two clamp screws per blade and that the torque of those two clamp screws has to be chosen depending on the individual inaccuracy of blade and slot. It is also possible that due to the particular shape of blade and slot, no change in blade radius such as an increase of the blade radius or a reduction of the blade radius will occur. In such a case, an adjustment of this particular slot/blade combination might not be possible. Method 2 is based on coincidences which can only be controlled by time consuming trial and error loops.

SUMMARY OF THE INVENTION

The present invention is directed to a bevel gear manufacturing face cutter head for face hobbing and face milling wherein the cutter head comprises positive blade seating and the capability to clamp the blades tight to the positive seating surfaces and to adjust the stick blades radially after they are pre-clamped and axially located.

The inventive cutter head is generally disc-shaped and rotatable about a cutter head axis. The cutter head comprises a first side and a second side, one or more cutting blade positioning slots arranged in the cutter head with each of the blade positioning slots extending between the first and second sides. The blade positioning slots each have at least one blade seating surface extending between said first and second sides with the blade seating surface having a modified shape and extending from the first side to the second side wherein the modified shape departs from the shape of a continuous straight-line shaped seating surface extending from the first side to the second side.

Preferably, the modified shaped seating surface includes a first portion extending from one of the first or second side to a predetermined location between the first and second sides with the first portion having a first shape, and a second portion extending from the predetermined location to the other of the first or second side with the second portion having a shape such that the shape of the first portion and the shape of the second portion together do not describe a continuous straight line (same slope throughout) extending from the first side to the second side. The first portion is preferably straight and the second portion is preferably curved.

DETAILED DESCRIPTION OF THE PREFERRED EMBODIMENT

Figure 1:
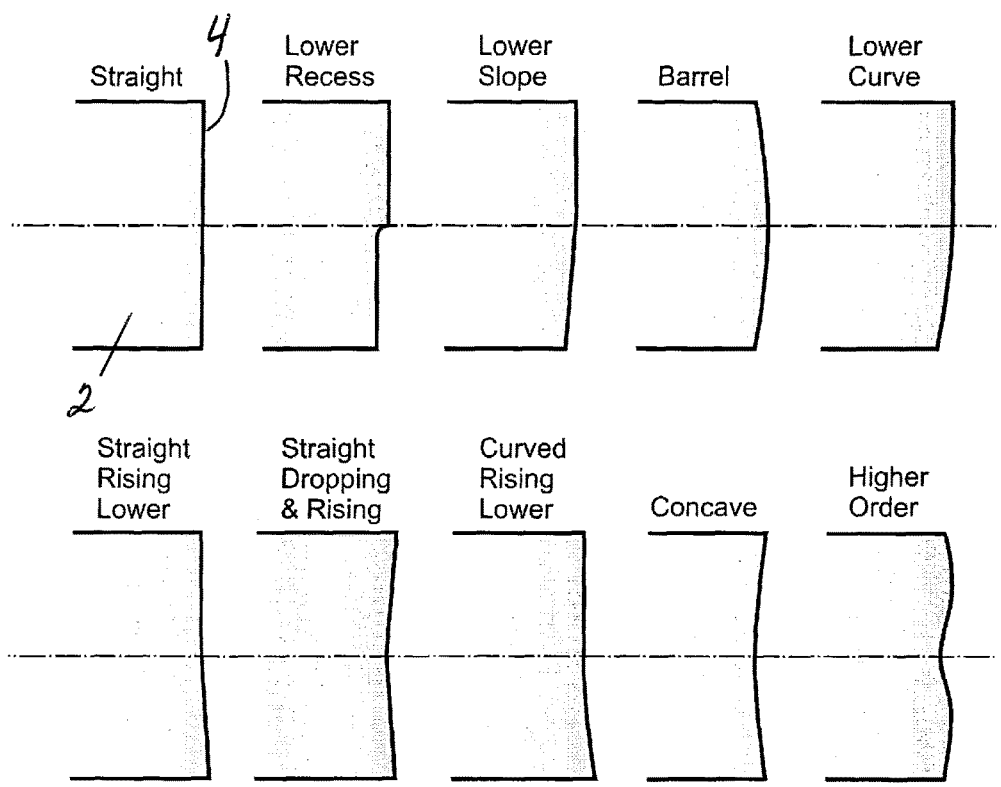
FIG. 1 shows a plurality of different seating surface modifications of cutter head slots for stick blades.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers.

The use of "including", "having" and "comprising" and variations thereof herein is meant to encompass the items listed thereafter and equivalents thereof as well as additional items. The use of letters to identify elements of a method or process is simply for identification and is not meant to indicate that the elements should be performed in a particular order.

Although references may be made below to directions such as upper, lower, upward, downward, rearward, bottom, top, front, rear, etc., in describing the drawings, there references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance unless specified.

The invention is directed to the development of a bevel gear cutter head with one or more cutting blades that can be adjusted radially in a determined way, without or with a minimum of side effects. Those side effects can be blade tip height variation, blade offset variation, blade rotation around all three axes (X, Y, Z) in space, and/or loss of blade seating stiffness.

Blade seating surfaces can be modified from their straight (plane) initial shape with modifications including a recess, a slope in the lower (or upper) section, a barrel shape, a curved recess in the lower (or upper) section, a straight rising shape in the lower (or upper) section, a straight dropping and rising shape, a curved rising shape in the lower (or upper) section, a concave shape or a higher order modification as shown in FIG. 1.

FIG. 1 shows examples of different modifications of seating surfaces 4 in cutting blade positioning slots in cutter heads 2 for stick or bar type cutting blades. The straight seating surface is state of the art and the invention provides seating surfaces having shapes that depart from the straight-line shape of a continuous straight seating surface between opposed sides of a cutter head (e.g. compare "Straight" and "Lower Curve" shapes of FIG. 1). Lower recess, lower slope, lower curve, straight rising and curved rising are modifications which also can be made in the upper area of the seating surface which is closer to the cutting edge stick out. The initial seating is preferably provided by a straight portion, not the modified portion of a seating surface. An increase of the torque of the clamp screw which is located in the recessed area will lead to a blade inclination (and some blade bending) which will change the radial location of the blade tip. Straight dropping and rising has its low point at the dash dotted line, it can be reversed in order to have the high point at the dash dotted line. Straight dropping and rising as well as concave and higher order modifications allow radial blade tip movement if a screw is present at the dash dotted line and elastically deforms the blade.

Figures 2A, 2B:
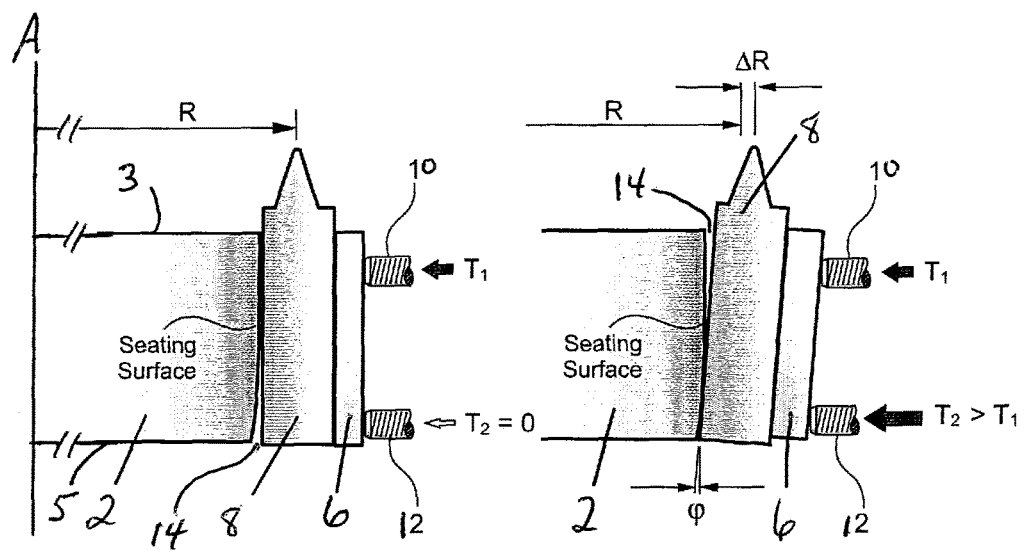
FIG. 2(a) shows cross section of a cutter head with a stick blade which is connected to the cutter head with a clamp block and two clamp screws with only the upper clamp screw being under torque.
FIG. 2(b) shows the same cross section as FIG. 2(a) with the lower clamp screw having a higher torque than the upper clamp screw.

FIGS. 2(a) and 2(b) show the inventive blade adjustment principle with reference to a cutter head 2 having a top surface 3, a bottom or back surface 5 and being rotatable about a cutter axis, A, and having a cutter radius, R. A blade position slot having a modified seating surface is shown extending between top surface 3 and bottom surface 5. A stick blade 8 is pressed with a clamp block 6 onto the modified seating surface (e.g. "Lower Curve" of FIG. 1) without torque from lower screw 12 (FIG. 2a) and with torque from lower screw 12 which is higher than torque from upper screw 10 (FIG. 2b). If the blade clamping force of the upper screw 10 can be held constant or nearly constant due to elasticity of the upper clamp screw, the clamping torque of the lower screw 12 can be increased in order to swing the cutting blade 8 by effectively rolling the cutting blade 8 on the modified seating surface in the clockwise direction. The elasticity in the upper clamp screw arrangement prevents a significant clamp force increase in the top section and a blade rolling rather than a blade deflection occurs. If the upper clamp screw 10 does not have sufficient elasticity, a combination of blade bending and blade rolling occurs which still will allow a radial adjustment of the cutting blade 8. In both cases, the gap 14 between blade and seating surface is transferred from the bottom section (FIG. 2a) to the top section (FIG. 2b). If the shown seating surface is perpendicular to the axial direction of the clamp screws, then the result is a reduction of clamping stiffness.

Depending on the number of clamp screws or pressure points (e.g. one, two or three), blade tip movement, ΔR, in the radial direction R can be achieved depending on the torque of the clamp provisions (see FIG. 2b). One side effect is a change of the cutting edge pressure angle by φ. A second side effect is the gap 14 between blade and slot in the upper or lower section of the seating surface, which may reduce the blade seating stiffness.

Figure 3:
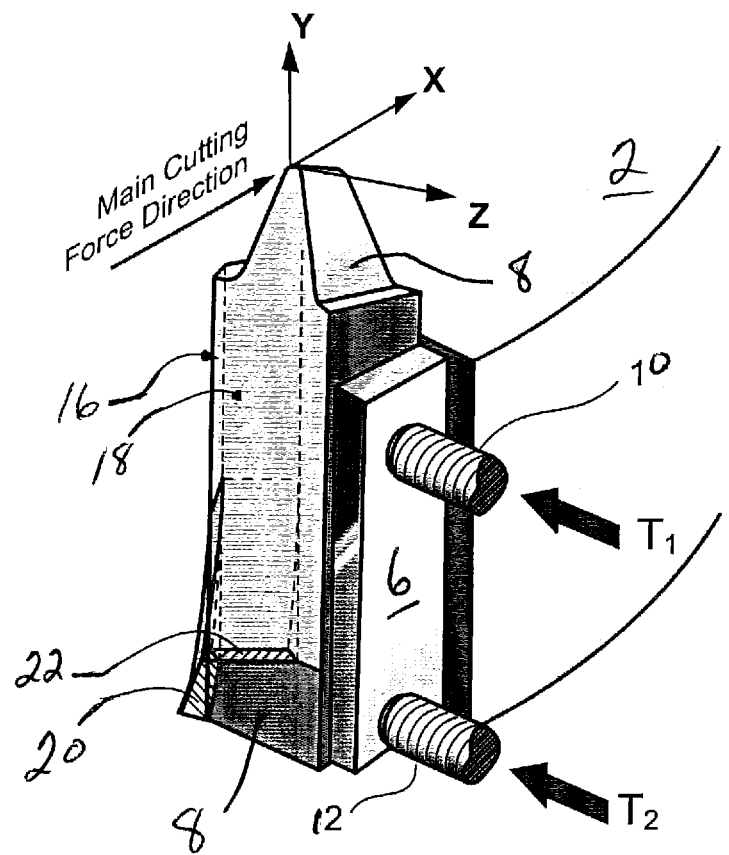
FIG. 3 shows a three dimensional view of a cutting blade with a pentagon shaped cross section and positive seating in a cutter head slot. The lower sections of both blade seating surfaces are modified.

The inventive cutter head design preferably accommodates a stick blade system of the type having pentagon shaped blade cross-section. FIG. 3 shows a three dimensional view of a cutting blade with a pentagon-shaped cross section (e.g. of the type as disclosed in U.S. Pat. Nos. 5,890,846 or 6,120,217) and positive seating in a cutter head slot of the invention. The lower section of each blade seating surface 16, 18 of a cutter head slot is modified with a respective curved recess 20, 22. If the lower portion of the seating surfaces are modified e.g. with a certain crowning, then it is possible to use the force created by the lower clamp screw in order to rotate the blade thereby radially adjusting the position of the blade tip. The torque T1 clamps the stick blade 8 against the flat upper portion of the seating surfaces 16, 18, while the torque T2 rolls the blade in clockwise direction, which will move the blade tip in the positive Z direction. The blade rotation moves the gap from the bottom recess to the top section, which may reduce the blade seating stiffness.

Figure 4:
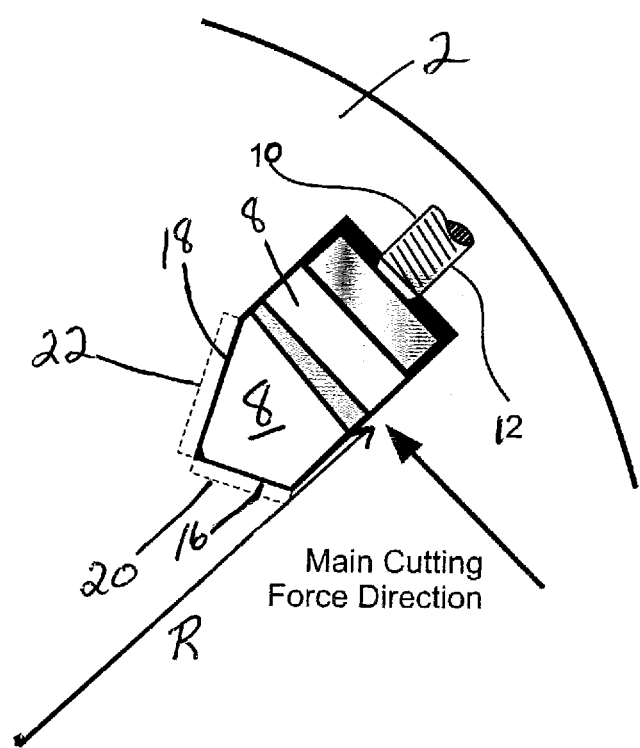
FIG. 4 shows a two dimensional top view of a cutting blade with a pentagon shaped cross section in a cutter head slot. The dashed lines indicate the modification of both seating surfaces in the lower (not visible) section of the seating surfaces.

FIG. 4 shows a two dimensional top view onto blade with a pentagon shaped cross section in a cutter head slot. The dashed lines indicate the modification 20, 22 of both seating surfaces 16, 18 in the lower (not visible) section of the seating surfaces. The two clamp screws 10, 12 in this view are on top of each other. The cutting blade 8 is tight to the seating surfaces 16, 18 on top because the torque on the lower clamp screw 12 has not yet been applied.

Figure 5:
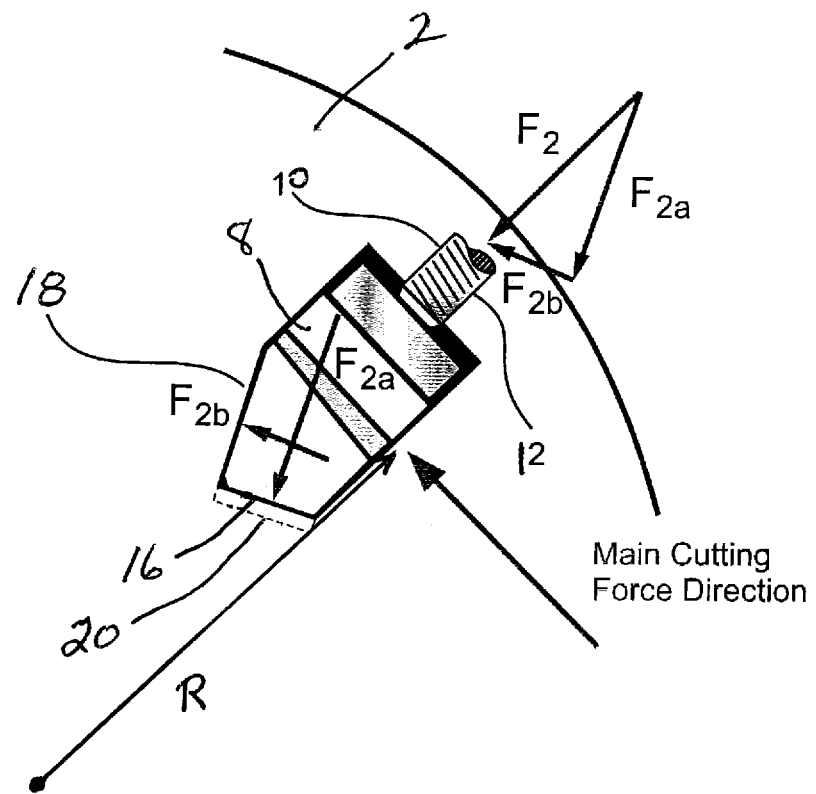
FIG. 5 shows a two dimensional top view of a cutting blade with a pentagon shaped cross section in a cutter head slot. The dashed lines indicate the modification of the seating surface which is more tangentially to the cutting circle oriented in the lower (not visible) section of the seating surface.

The inventors have discovered that with respect to cutter heads having pentagon shaped cutting blade mounting slots with multiple seating surfaces being asymmetrically oriented as shown, for example, by surfaces 16, 18 in FIGS. 4 and 5, the seating surface that is oriented more closely to perpendicular with respect to cutter radius R is the preferred seating surface to be modified in accordance with the invention to permit effective blade movement. For example, in FIGS. 4 and 5, seating surface 16 is closer to being perpendicular to radius, R, than is seating surface 18. Thus, it is preferable to modify seating surface 16. It is shown that the lower section of seating surface 16 has been modified and the lower clamp screw 12 is torqued ($F_2$) to effect a radial adjustment in the position of the tip of cutting blade 8 as a result of clamp force component $F_{2a}$ which is directed onto the modified and "more perpendicularly oriented" seating surface 16. The component $F_{2a}$ is moving the lower blade portion into the modified recessed area 20, while the force component $F_{2b}$ assures constant contact between cutting blade 8 and the "less perpendicularly oriented" seating surface 18.

In the embodiment shown in FIGS. 4 and 5, the "less perpendicularly oriented" seating surface 18 will not be modified. The clamp screw force component $F_{2b}$ will at the same time press the blade sufficiently against the steeper seating surface. The force on the seating surface 18 will prevent surface separation of the cutting blade and cutter head. Also, the majority of the cutting force is oriented against seating surface 18 which will result in a well clamped blade 8 with good seating stiffness.

Figure 6:
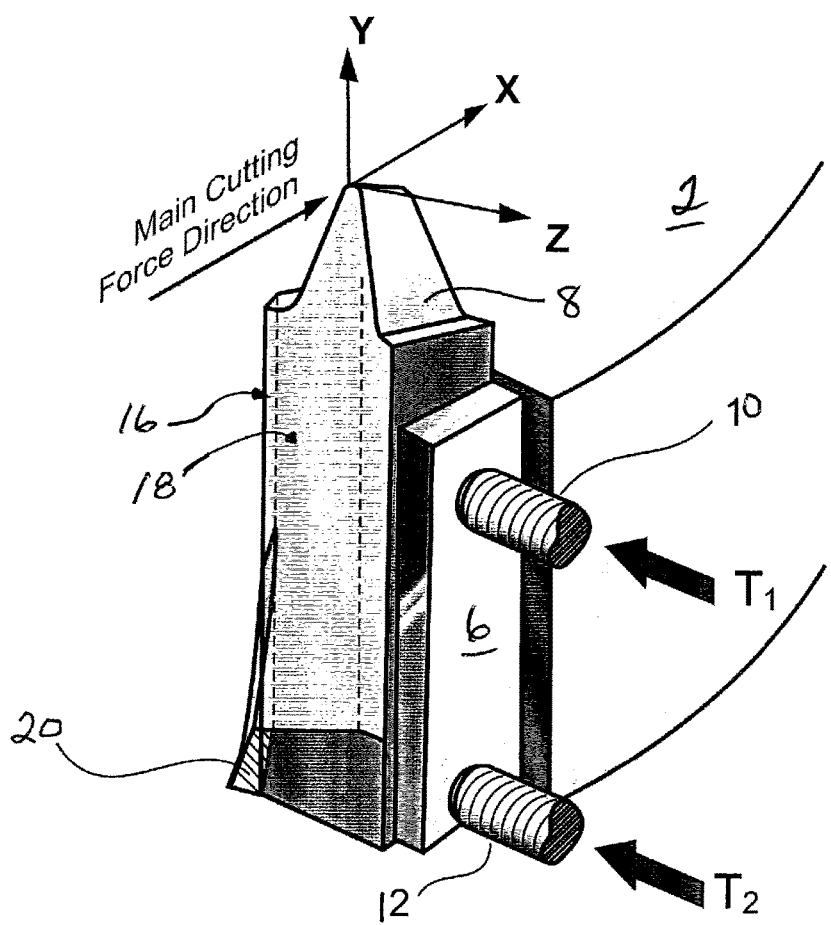
FIG. 6 shows a three dimensional view of a cutting blade with a pentagon shaped cross section and positive seating in a cutter head slot. The lower sections of the seating surface which is more tangentially to the cutting circle oriented is modified.

FIG. 6 shows a three dimensional view of a blade with a pentagon shaped cross section and positive seating in a cutter head slot. Only the lower sections of the seating surface which is more perpendicularly oriented with respect to cutter radius, R, has been modified. The clamp forces have a component onto both seating surfaces. If the torque on the lower clamp screw 12 is increased, then the blade 8 will still stay in contact with the "less perpendicularly oriented" seating surface 18 and slide along this surface into the recessed area 20. As a result of in increased clamping via clamp screw 12, the gap at the bottom of the recessed seating 16 surface will reduce and a gap is developed at the top of the same seating surface (see 14 in FIGS. 2a and 2b for example).

Since the "less perpendicularly oriented" seating surface 18 cannot separate from the cutting blade 8, the force component $F_{2a}$ (FIG. 5) is moving the lower part of the cutting blade into the recess 20 of the "more perpendicularly oriented" seating surface 16 (FIG. 6) and the blade will rotate around a horizontal axis "P" (FIG. 7) which is normal to the less-perpendicularly-oriented seating surface 18. This arrangement is one preferred embodiment of the inventive cutter head slot design.

Figure 7:
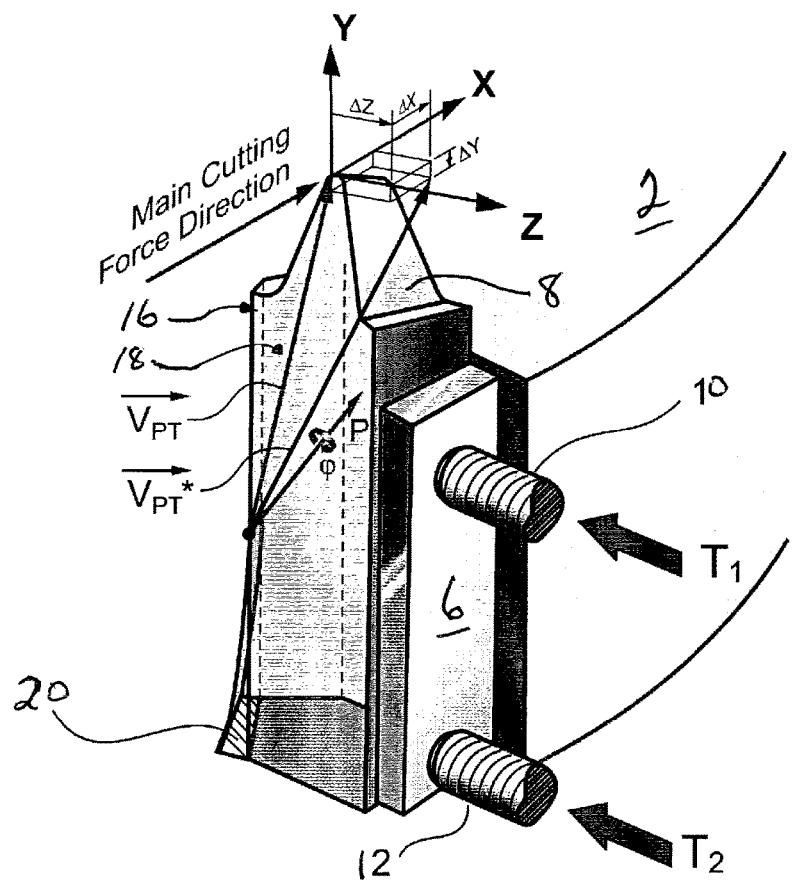
FIG. 7 shows a three dimensional view of a cutting blade with a pentagon shaped cross section and positive seating in a cutter head slot. The lower sections of the seating surface which is more tangentially to the cutting circle oriented is modified. P is the axis and φ the direction of blade rotation for blade adjustments. $V_{PT}$ is the pivot-tip-distance vector before blade adjustment and $V_{PT}^*$ is the pivot-tip-distance vector after adjustment.

FIG. 7 shows a three dimensional view of a blade with a pentagon shaped cross section and positive seating (surfaces 16, 18) in a cutting blade slot of a cutter head 2. The lower section of the seating surface 16 which is more-perpendicularly-oriented to cutter radius, R, is modified. P is the axis and φ the direction of blade rotation for blade adjustments. $V_{PT}$ is the pivot-tip-distance vector before blade adjustment, $V_{PT}^*$ is the pivot-tip-distance vector after adjustment. The adjustment moves the blade in the ΔZ direction, which is the desired radial change of the blade tip location. Due to the rotational sliding of the cutting blade 8, an accompanying change in the X direction as well as a change in the Y direction will also occur. While both X and Y positional changes would generally be considered to be undesirable, the inventors have determined such changes are small and have negligible influence to the tooth geometry formed by the cutting process. An additional side effect of the inventive blade adjustment is an angular change of the cutting edge of generally the same magnitude as the blade rotation (or rolling) angle φ. However, radial blade adjustments in the amount of 0.010 mm change the effective cutting edge pressure angle only by about 1 angular minute. Such a variation from blade to blade is also negligible to the cutting performance and the produced tooth flank geometry.

As an example, a mathematical description of the blade tip movement as result of an adjustment was made using the coordinate system shown with the cutting blade and slot in FIG. 7. The horizontal axis of rotation P is perpendicular to the less-perpendicularly-oriented seating surface. In order to achieve a rotation around P, the direction of P is lined up with the X-axis of the coordinate system in FIG. 7, which requires one rotation around the Y-axis of the amount of the angle between the P-direction and the X-axis. In pentagon shaped stick blades this angle is −γ (which is commonly −30°. Then, a rotation around the X-axis of the amount of a large but realistic rotation φ (depending on the seating surface modification magnitude) is chosen, for example, to be 0.08°. After this rotation, a back rotation into the original direction of P is conducted, which requires a rotation γ around the Y-axis of 30°.

The rotation matrix about the Y-axis of $-\gamma$ is:

$$(-GAMA) = \begin{pmatrix} \cos(-\gamma) & 0 & \sin(-\gamma) \\ 0 & 1 & 0 \\ -\sin(-\gamma) & 0 & \cos(-\gamma) \end{pmatrix}$$

The blade adjustment rotation about the X-axis of $\varphi$ is:

$$(PHI) = \begin{pmatrix} 1 & 0 & 0 \\ 0 & \cos\varphi & -\sin\varphi \\ 0 & \sin\varphi & \cos\varphi \end{pmatrix}$$

The back rotation matrix about the Y-axis of $\gamma$ is:

$$(-GAMA) = \begin{pmatrix} \cos(\gamma) & 0 & \sin(\gamma) \\ 0 & 1 & 0 \\ -\sin(\gamma) & 0 & \cos(\gamma) \end{pmatrix}$$

where: $\gamma=30°$
$\varphi=0.08°$

The initial pivot-tip-distance vector for a medium pitch blade is:

$$\vec{V_{PT}} = \{V_{PTX}, V_{PTY}, V_{PTZ}\} = \{3 \text{ mm}, 32 \text{ mm}, 6 \text{ mm}\}$$

Multiplication of the rotation matrixes in the order of rotations from left to right delivers the matrix (ROT), which contains all three rotations:

$$(ROT) = (+GAMA) \times (+PHI) \times (-GAMA)$$

A multiplication of the pivot-tip-distance vector with the matrix (ROT) will consider the exact rotation of the pivot-tip-vector around the horizontal axis P:

$$\vec{V_{PT*}} = (ROT) \times \vec{V_{PT}}$$

The result of the vector-matrix multiplication is shown below in its general form:

$$\vec{V_{PT*}} = \begin{Bmatrix} V_{PTX}[\cos\gamma\cos(-\gamma) - \sin\gamma\cos\varphi\sin(-\gamma)] + V_{PTY}\sin\gamma\cos\varphi + \\ V_{PTZ}[\cos\gamma\sin(-\gamma) + \sin\gamma\cos\varphi\cos(-\gamma)] \\ V_{PTX}\sin\varphi\sin(-\gamma) + V_{PTY}\cos\varphi - V_{PTZ}\sin\varphi\cos(-\gamma) \\ V_{PTX}[-\sin\gamma\cos(-\gamma) - \cos\gamma\cos\varphi\sin(-\gamma)] + V_{PTY}\cos\gamma\sin\varphi + \\ V_{PTZ}[\sin\gamma\sin(-\gamma) + \cos\gamma\cos\varphi\cos(-\gamma)] \end{Bmatrix}$$

If the vector components of $V_{PT}$ and the angles $\gamma$ and $\varphi$ are substituted into the three component formulas above, then the result for the pivot-tip-distance vector after adjusting can be obtained:

$$\vec{V_{PT*}} = \{3.002 \text{ mm}, 31.991 \text{ mm}, 6.0387 \text{ mm}\}$$

The subtraction of the pivot-tip-distance vector before adjustment from the pivot-tip-distance vector after adjustment delivers the components of blade tip position change due to the adjustment.

$$\Delta X = V_{PTX}* - V_{PTX} = 0.002 \text{ mm}$$

$$\Delta Y = V_{PTY}* - V_{PTY} = -0.009 \text{ mm}$$

$$\Delta Z = V_{PTX}* - V_{PTZ} = 0.039 \text{ mm}$$

The blade pressure angle change can be calculated with:

$$\Delta\alpha = \arctan\left(\frac{\Delta z}{V_{PTY*}}\right)$$

$$\Delta\alpha = 0.07°$$

The Y-axis of the coordinate system in FIG. 6 was chosen parallel to the cutter axis of rotation and the extension of the Z-axis to the left (negative direction intersects with the cutter axis of rotation. The theoretical blade front is oriented in the plane which is defined by the Y and Z axes. Although stick blades in real cutter heads are commonly inclined with their length direction versus the Y-axis and have an offset with their theoretical front face versus the Z-axis, the principle function of the adjustment will not change and the resulting blade tip position and angle changes will only differ in the single percent.

It is understood that blade systems which use blades with inside and outside cutting edges on each blade require a special kind of radial blade adjustment. If the blade tip radius is increased, then both cutting edges of such a blade move to a larger radius. However, the present invention for adjustable blade radii is well suited in order to find optimal compromises for the radial location of both cutting edges of one blade and realize them.

It is also understood that the preferred embodiment of the inventive method will only increase the blade tip radius but not reduce it. Cutter heads might require reduction or increase of the blade tip radius in order to adjust them to a reference blade. Since reference blades are usually chosen arbitrarily (e.g. the blade in the slot labeled "1" as reference outside blade and the blade in the slot labeled "2" as reference inside blade), it is possible to choose the outside and inside blade with the largest radius as reference blades. With this procedure, it will always be possible to improve all blades of one kind (inside or outside) by adjusting the position of the tip towards the radius of the respective reference blade. The radius variation between theoretically correct cutter radius and effective radius of an arbitrarily chosen reference blade is in most cases below 0.002 mm and has no measurable influence to the machined tooth surfaces.

With respect to the modified seating surface, the magnitude of the recess or modification depth may be any amount depending upon the parameters of the cutting tool and the cutting process. However, the preferred range is between 0.010 mm and 0.050 mm. The height of the recess or modified area is preferably about 50% to about 75% of the clamping length. The inventive cutter head design applies to tool systems with or without clamp blocks.

Figure 8:
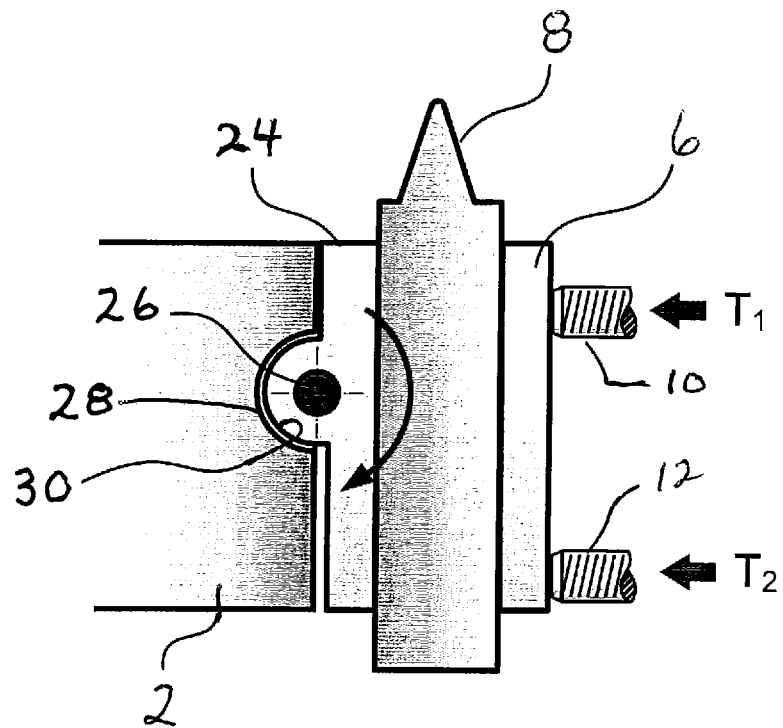
FIG. 8 shows a cross sectional view of a clamp block-blade-seating surface arrangement but instead of the modified blade seating surface in FIG. 2(b) it shows a pivot block which has the blade seating surface on its right side and a pivot arrangement on the left side (towards the cutter center).

In an alternative embodiment, FIG. 8 shows a cross sectional view of a clamp block-blade-seating surface arrangement comprising a pivot or swivel block 24 which has the blade seating surfaces on its right side and a pivot arrangement on the left side (towards the cutter center). The pivot center can be accomplished with a pivot pin 26 or just by the curved fit of the pivot surfaces 28, 30. The upper clamp screw 10 is tightened to a specified torque after the blade is in the slot. The lower clamp screw is then tightened to the same torque. After radial blade position measurement, the upper screw is turned out by an amount, such as, for example, 5° (screw rotation). Then the lower screw is turned in by the same amount, e.g. 5°. Depending on the lead of the screw threads, this will move the blade tip radially out by about 0.039 mm for example.

Figure 9:
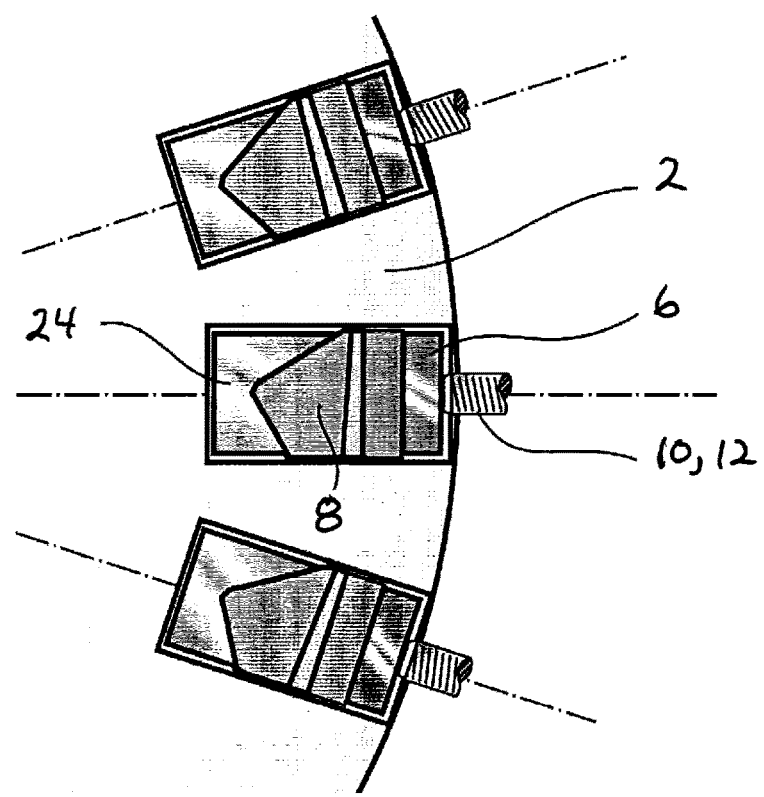
FIG. 9 is a top view of a section of the cutter head of FIG. 8 showing three blade slots with cutting blades.

FIG. 9 shows a top view onto a section of the cutter head from FIG. 8 with three blade slots and cutting blades 8. The swivel blocks 24 are visible to the left of the seating surfaces.

Figure 10:
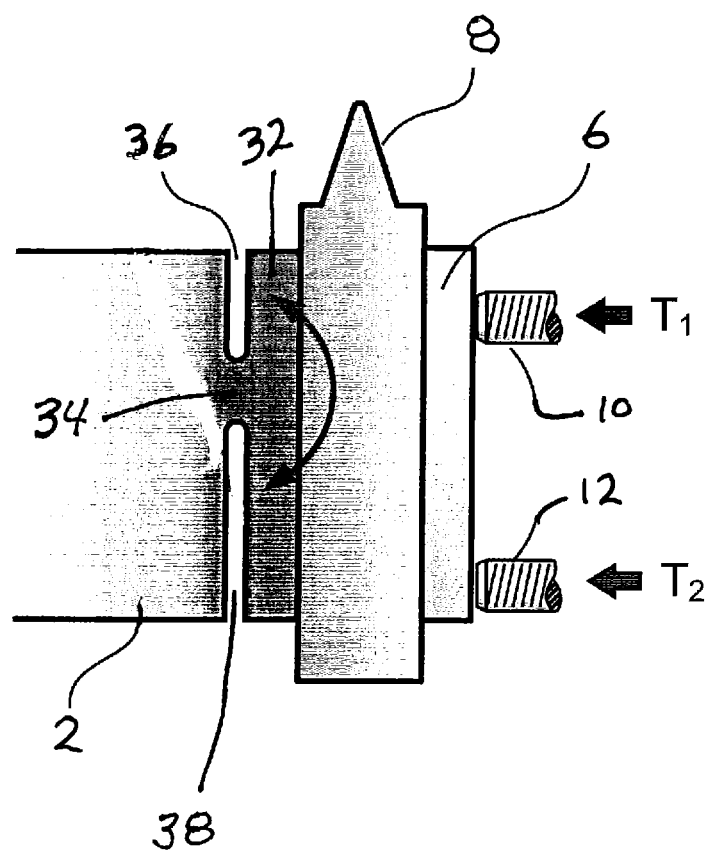
FIG. 10 shows a cross sectional view of a clamp block and blade-seating surface arrangement but instead of the modified blade seating surface in FIG. 2(b) it shows a pivot block with a compliance element instead of a mechanical pivot axis. This element uses the linear elastic property of steel in order to allow the seating surface to pivot. The blade seating surface is on its right side and a pivot arrangement on the left side (towards the cutter center).

In another embodiment, FIG. 10 shows a cross sectional view of a clamp block-blade-seating surface arrangement comprising a pivot block 32 with a compliance element instead of a mechanical pivot axis as in FIG. 9. This element uses the linear elastic property of the cutter head material (e.g. steel) in order to allow the seating surface to pivot. The blade seating surface is located on the right side of the pivot block 32 and a pivot arrangement on the left side (towards the cutter center). The pivot center in this drawing is accomplished by the rib 34 between upper and the lower compliance slots 36, 38. The compliance slots are oriented such that they favor the "more perpendicularly oriented" seating surface (see FIGS. 4 and 5). Both clamp screws 10, 12 are tightened to a specified torque after the blade 8 is in the slot. After radial blade position measurement, the upper screw 10 may be turned out by an amount, such as, for example, 5° (counterclockwise screw rotation). Then, lower screw 12 may be turned in by the same amount, e.g. 5° in a clockwise direction. Depending on the lead of the screw threads, this will move the blade tip radially out by about 0.039 mm for example.

Figure 11:
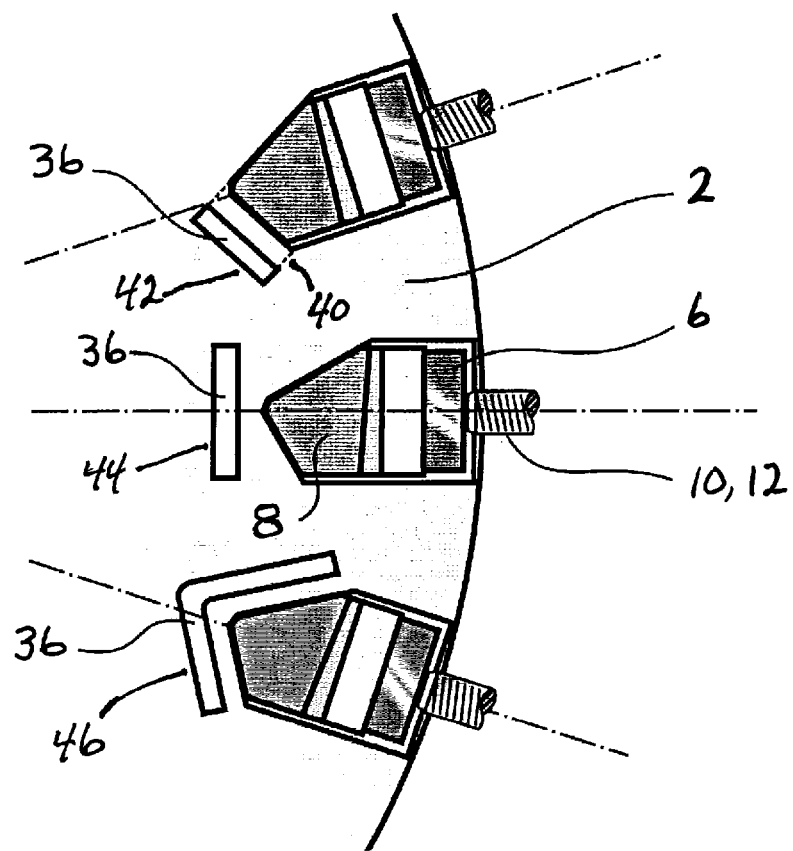
FIG. 11 is a top view of a section of the cutter head of FIG. 10 showing three blade slots with cutting blades.

FIG. 11 shows a top view onto a section of the cutter head 2 of FIG. 10 with three blade slots and cutting blades. The compliance elements are only visible by the gaps or slots 36 to the left of the seating surfaces. Version 1 (shown at 42) provides a good controllable compliance (by design parameters) to the "more perpendicularly oriented" seating surface. The dotted connections 40 between compliance slot and seating surface represent optional thin slots, manufactured (e.g. by wire EDM) which assure sufficient swivel rotation (rotational arrow in FIG. 10) during the blade adjusting procedure. Version 2 (shown at 44) provides a general compliance below both seating surfaces. Version 3 (shown at 46) provides a good controllable compliance (by design parameters) to both seating surfaces. Preferably, the width of a compliance slot 36, 44, 46 is generally equal to the width of one or both blade seating surfaces and may be positioned parallel to one (42) or both (46) blade seating surfaces or perpendicular to the cutter radius (44).

The location of the material connection rib 34 creates the pivot axis. The location of the pivot axis and the adjustment principle is similar to the principle explained with respect to FIGS. 2, 3, 5, 6 and 7. The major difference of the seating surface with a compliance modification is that no separation between the "more perpendicularly oriented" seating surface and the cutting blade occurs and that blade adjustments in both directions (to a larger radius as well as to a smaller radius) can be achieved. The arrangement shown at 42 uses a compliance slot orientation which affects the "more perpendicularly oriented" seating surface only. The amount of compliance can be controlled with the thickness of the rib and with the optional thin connections 40 between the compliance gap 36 and the two ends of the "more perpendicularly oriented" seating surface (dotted lines in FIG. 11). In order to control the adjustment, the compliance slots can be oriented like the pivot block in FIGS. 8 and 9 (to affect both seating surfaces) as shown at 44 in FIG. 11. Another possibility of compliance slot design is shown at 46 in FIG. 11.

While the invention has been described with reference to preferred embodiments it is to be understood that the invention is not limited to the particulars thereof. The present invention is intended to include modifications which would be apparent to those skilled in the art to which the subject matter pertains.

What is claimed is:

1. A bevel gear face cutter head for face hobbing and face milling of bevel and hypoid gears, said cutter head being generally disc-shaped and rotatable about a cutter head axis, said cutter head comprising:
   a top surface and a bottom surface,
   one or more cutting blade positioning slots arranged in said cutter head with each of said blade positioning slots extending between said top surface and said bottom surface,
   said blade positioning slots each having at least one blade seating surface extending between said top surface and said bottom surface,
   said at least one blade seating surface having a modified shape and extending from said top surface to said bottom surface wherein said modified shape departs from the shape of a continuous straight seating surface extending from said top surface to said bottom surface,
   wherein rolling of a cutting blade having a blade tip on the modified seating surface allows for radial adjustment of the blade tip of the cutting blade.

2. The cutter head of claim 1 wherein said modified shape comprises:
   a first portion extending from one of said top or bottom surfaces to a predetermined location between said top and bottom surfaces, said first portion having a first shape,
   a second portion extending from said predetermined location to the other of said top or bottom surfaces, said second portion having a shape such that the shape of said first portion and the shape of said second portion together do not describe a continuous straight line extending from said top surface to said bottom surface.

3. The cutter head of claim 2 wherein the shape of at least one of said first portion and said second portion is curved.

4. The cutter head of claim 2 wherein the shape of at least one of said first portion and said second portion is straight.

5. The cutter head of claim 2 further including one or more clamp screws.

6. The cutter head of claim 5 comprising one clamp screw positioned to exert a force at said predetermined location.

7. The cutter head of claim 5 comprising two clamp screws with a first clamp screw positioned to exert a force on said first portion and a second clamp screw positioned to exert a force on said second portion.

8. The cutter head of claim 1 wherein said one or more cutting blade positioning slots defines a generally pentagon-shaped cross section.

9. The cutter head of claim 8 wherein said one or more cutting blade positioning slots include two blade seating surfaces.

10. The cutter head of claim 9 further including at least one clamping screw positioned to exert a force against one of said two blade seating surfaces.

11. The cutter head of claim 10 wherein said force is exerted against the one of said two blade seating surfaces which is oriented closest to perpendicular with respect to a cutter radius reference vector R, said one blade seating surface being modified.

12. The cutter head of claim 11 wherein the other of said two blade seating surfaces is straight.

* * * * *